(12) United States Patent
Karakotsios et al.

(10) Patent No.: US 9,213,436 B2
(45) Date of Patent: Dec. 15, 2015

(54) FINGERTIP LOCATION FOR GESTURE INPUT

(75) Inventors: Kenneth M. Karakotsios, San Jose, CA (US); Isaac S. Noble, Soquel, CA (US); Dong Zhou, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 139 days.

(21) Appl. No.: 13/528,522

(22) Filed: Jun. 20, 2012

(65) Prior Publication Data

US 2013/0342459 A1    Dec. 26, 2013

(51) Int. Cl.
  *G06F 3/033* (2013.01)
  *G09G 5/08* (2006.01)
  *G06F 3/041* (2006.01)
  *G06F 3/042* (2006.01)

(52) U.S. Cl.
  CPC ............ *G06F 3/0418* (2013.01); *G06F 3/0425* (2013.01)

(58) Field of Classification Search
  CPC ....... G06F 3/0425; G06F 3/044; G06F 3/046; G06F 3/0482; G06F 2203/04106; G06F 2203/04108
  USPC ...................... 345/156, 173–175; 348/61, 77; 382/100, 103, 115
  See application file for complete search history.

(56) References Cited

U.S. PATENT DOCUMENTS

| | | | |
|---|---|---|---|
| 7,598,942 B2 * | 10/2009 | Underkoffler et al. ........ 345/158 |
| 2007/0211031 A1 | 9/2007 | Boillot | |
| 2008/0273755 A1 | 11/2008 | Hildreth | |
| 2009/0139778 A1 | 6/2009 | Butler et al. | |
| 2010/0040292 A1 * | 2/2010 | Clarkson ........................ 382/201 |
| 2010/0164891 A1 * | 7/2010 | Hill et al. ....................... 345/173 |
| 2010/0188428 A1 | 7/2010 | Shin et al. | |
| 2011/0063224 A1 * | 3/2011 | Vexo et al. ..................... 345/168 |
| 2011/0169746 A1 | 7/2011 | Kitajima | |
| 2011/0221706 A1 | 9/2011 | McGibney et al. | |
| 2011/0267265 A1 * | 11/2011 | Stinson .......................... 345/157 |
| 2012/0089348 A1 * | 4/2012 | Perlin et al. ...................... 702/41 |
| 2012/0314899 A1 * | 12/2012 | Cohen et al. ................... 382/103 |
| 2013/0097550 A1 | 4/2013 | Grossman et al. | |

OTHER PUBLICATIONS

"International Search Report and Written Opinion Dec. 20, 2013," International Application No. PCT/US13/46906, 9 pages.
"Non-Final Office Action dated Apr. 24, 2014," U.S. Appl. No. 13/528,532, Apr. 24, 2014, 11 pages.
"Final Office Action dated Oct. 31, 2014," U.S. Appl. No. 13/528,532, 11 pages.

* cited by examiner

*Primary Examiner* — Kenneth Bukowski
(74) *Attorney, Agent, or Firm* — Novak Druce Connolly Bove + Quigg LLP

(57) ABSTRACT

A user can use a finger, or other such object, to provide input to a computing device. The finger does not have to contact the device, but can be positioned and/or oriented in such a way that the device can determine an input that the user is attempting to provide, such as an element or icon that the user is intended to select. One or more cameras can capture image information, which can be analyzed to attempt to determine the location and/or orientation of the finger. If the finger is at least partially outside a field of view of the camera(s), the device can use a sensor (e.g., EMF) to attempt to determine a location of at least a portion of the finger, which can be used with the image information to determine the location and/or orientation of the finger. Other estimation processes can be used as well.

23 Claims, 7 Drawing Sheets

FINGERTIP LOCATION FOR GESTURE INPUT

BACKGROUND

As computing devices offer increasing processing capacity and functionality, users are able to provide input in an expanding variety of ways. For example, a user might be able to control a computing device by performing a motion or gesture at a distance from the computing device, where that gesture is performed using a hand or finger of the user. For certain devices, the gesture is determined using a camera that is able to view the user, enabling the device to determine motion performed by that user. In some cases, however, at least a portion of the user will not be within the field of view of the camera, which can prevent the device from successfully determining the motion or gesture being performed. Even when the portion of the user performing the motion or gesture is within the field of view, it can be difficult to determine with accuracy which input the user is attempting to provide, such that the detectable gestures are limited to simple, broad motions that reduce their effectiveness.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to determining input to an electronic device. In particular, various embodiments enable the providing of motion, gesture, or hover based input using a fingertip or other such object. In at least some embodiments, one or more cameras can capture image information that can be analyzed to determine a relative position of a user's fingertip. If the fingertip falls outside the field of view of the camera(s), the device can attempt to use another sensor on the device to determine the fingertip position. If a sensor cannot accurately detect the fingertip, or if no such fingertip is available, the device can alternatively (or additionally) attempt to estimate the fingertip position using information known about the user, such as the size of the user's hand, length of the user's finger, and other such information. The device can also use any information that was obtained before the fingertip passed outside the field of view. Once the fingertip is located, an appropriate input to the device can be determined. In at least some embodiments, this determination includes determining the direction the finger is pointing, or a trajectory or "pointing" vector of the finger, and determining where that direction, pointing vector, or trajectory intersects with the device. Once determined, a user can provide input with an object or other element at or near the point of the intersection.

Various other functions and advantages are described and suggested below as may be provided in accordance with the various embodiments.

Figure 1A:
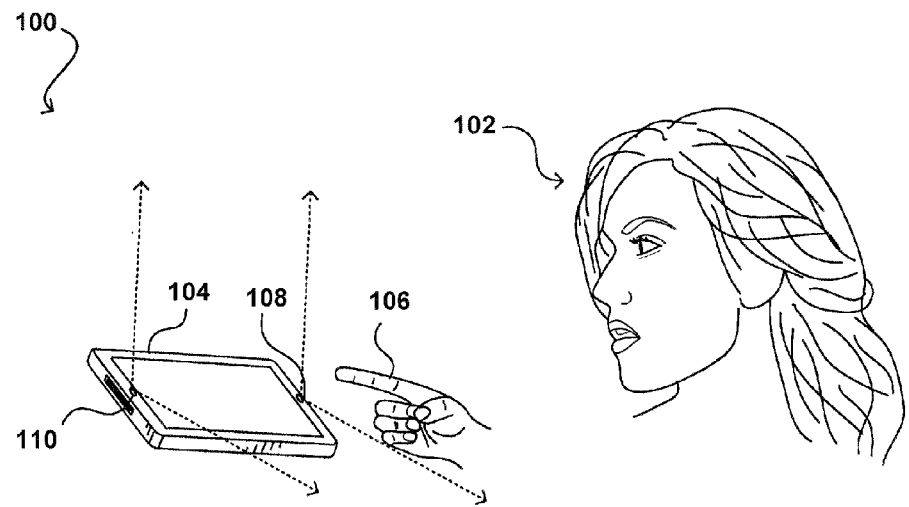
FIGS. 1(a), 1(b), and 1(c) illustrates an example environment in which aspects of various embodiments can be implemented, as well as imaged that can be captured while implementing some of those aspects.

FIG. 1(a) illustrates an example environment 100 in which aspects of the various embodiments can be implemented. In this example, a user 102 is attempting to provide gesture input to a computing device 104 using the user's finger 106. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, and portable media players, among others.

In this example, the computing device 104 includes a pair of cameras 108, 110, or other gesture sensors, configured to capture image information including a view of the user's finger 106, which can be analyzed by an application executing on the computing device to determine a relative location of the finger to the computing device 104. The image information can be still image or video information captured using ambient or infrared light, among other such options. Further, fewer or additional cameras of the same or different types can be used as well within the scope of the various embodiments. The application can determine the position of the finger, and can track the position of the finger over time by analyzing the captured image information, in order to allow for motion and/or gesture input to the device. For example, the user can move the finger up and down to adjust a volume, move the finger in a plane to control a virtual cursor, and the like.

Figures 1B, 1C:
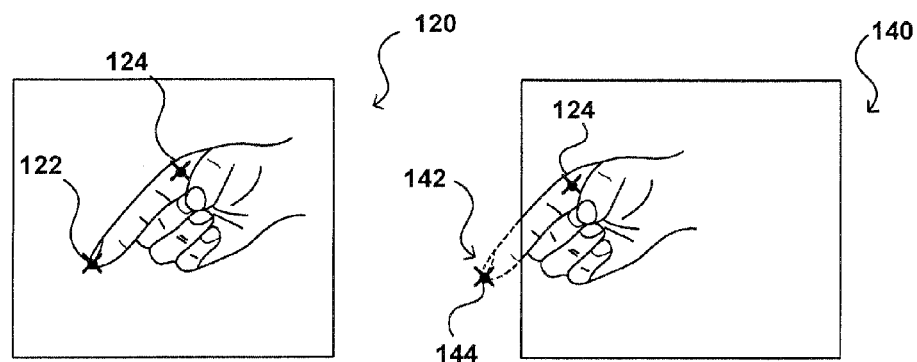

FIG. 1(b) illustrates an example image 120 that could be captured by one of the cameras 110 of the computing device 104. In this example image, the hand of the user can clearly be seen. An application executing on the computing device (or at least in communication with the computing device) can analyze the image to locate one or more features of the hand, such as a fingertip position 122 and a finger base location 124 that can be used to determine the general orientation of the user's finger, as well as the direction which the finger is generally pointing.

Relying on camera information can have certain drawbacks, however, as each camera will generally have a limited field of view. Even fisheye lenses have limited fields of view, or at least provide somewhat distorted images near the edge of the field of view. Accordingly, there will generally be one or more dead zones around the computing device where an object might fall outside the field of view of any of the cameras. For example, the image 140 of FIG. 1(c) illustrates a view from the same camera 110 when the hand has moved towards the center of the device. As illustrated, the fingertip 142 has moved outside the field of view, and thus is not contained in the image. Unless the fingertip entered the field of view of another camera, the device cannot view the fingertip in images captured from any of the cameras at that location.

In this example, the computing device can still see a portion of the hand, and using pattern recognition, image recognition, object recognition, or another such process can potentially still identify a portion, such as the finger base location 124, of the user's hand in the image 140. In at least some embodiments, the device can attempt to estimate, using statistical analysis or otherwise, the position of the user's fingertip using the visible portion of the user's hand. For example, if the device was able to view the user's fingertip at a point in the recent past and was able to determine the relative distance and direction of the fingertip to the base point 124, the device can use an extrapolation process to estimate that the fingertip point 144 is likely in a similar relative location. The device can track changes in the relative distance and orientation between the fingertip and base points, and can use these to estimate the location when at least one of those points falls outside the viewable area of at least one camera of the device.

In another embodiment, a computing device might store, or otherwise have access to, a model of the user's hand. Using information such as the size, shape, and relative configuration of the hand from the image information, the device can use the model to estimate the location of the fingertip. Based at least in part upon the model and the base point 124, physical limitations of the user's finger and hand will mean that the fingertip position is limited to a determinable range of locations. Using information such as the visible portion of the finger and the orientation of the hand, the device can further limit the potential region and, if a location can be determined with a reasonable amount of certainty or variation, that point can be used as the fingertip location 144. Various other such estimation approaches can be used as well within the scope of the various embodiments.

Figure 2:
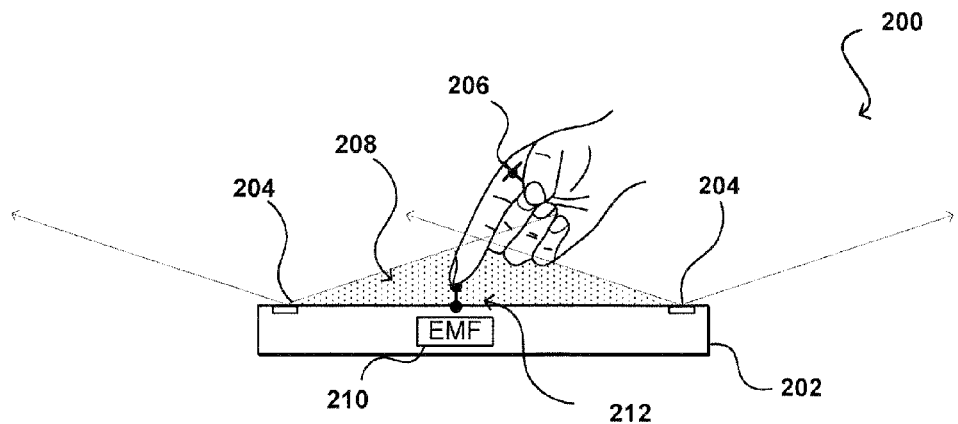
FIG. 2 illustrates an example environment in which a portion of a user's fingertip falls within a dead zone of device cameras, but can be processed in accordance with various embodiments.

In at least some embodiments, a computing device might include one or more other types of sensor or component that can assist with fingertip location in accordance with various embodiments. For example, FIG. 2 illustrates an example configuration 200 wherein a computing device is able to locate and/or track fingertip position using a pair of cameras 204 on the same side of the device as a display screen or other such element. As discussed, the cameras can capture stereo information about the fingertip and determine the location as long as the fingertip is within a field of view of at least one of the cameras 204. Between the cameras, and outside the field of view of each camera, is a "dead zone" 208 where the fingertip, or any other object, will be unable to be imaged by the cameras. In this example device 202, however, the device includes an electromagnetic field (EMF) sensor 210 (e.g., an EMF meter or EMF probe) that is positioned and configured to detect the presence of an object disturbing the ambient and/or a generated EMF. The EMF sensor can be any appropriate sensor, probe, meter, or other such element, operable to measure changes in EMF using broadband measurements, frequency-selective measurements, or any other such EMF-based approach.

In this example, the range of the EMF extends over at least a majority of the dead zone 208, and in at least some embodiments can partially extend beyond the dead zone in order to provide more accurate and continuous determinations. As the tip of the user's finger moves towards the dead zone, the EMF sensor can detect a change in the field, which can be used to estimate a relative position 212 of the closest point of the fingertip in three dimensions. Approaches for locating an object based on changes in the electromagnetic field are known in the art and as such will not be discussed in detail herein.

Since at least a portion of the user's hand is still visible to the cameras 204, the device can analyze the image information to determine the base point 206 of the user's forefinger. By combining this information with the fingertip location 212 determined using the EMF, the device can still determine the approximate angle, orientation, and/or trajectory of the finger using at least those two points. In cases where multiple fingertip locations are tracked for multi-finger input, for example, a similar approach can be used to locate those fingertips when in the dead zone, or another such location.

Other technologies can be used as well within the scope of the various embodiments. For example, a capacitive sensor can be used as well within the scope of the various embodiments. A capacitive sensor might not have the range of an EMF sensor, as a capacitive sensor might only be able to detect objects within a few millimeters of a surface, but can potentially be more accurate in at least some embodiments. A capacitive sensor also can give closest-point information for a fingertip, or other such object, in three dimensions. Ultrasonic or other such distance or location determining approaches can be used as well within the scope of the various embodiments.

As discussed, an EMF, capacitive, or other field-based approach can give information that relates to the closest point of an object to the device and/or sensor. In many cases, however, this will be offset some amount from the actual tip of an object such as a finger, where that offset can increase with angle from normal, or orthogonal, to the plane of the surface of the device. For devices, such as smart phones, with small displays and/or elements, this offset might be enough to cause the wrong element to be selected by the device.

In some embodiments, an application executing on the device can use information about the object (e.g., finger) to infer the actual fingertip position from the detected position and base point, or other such data points. For example, the device can know the general size and/or shape of a user's finger, either using general information or information specific to the user. Knowing information such as the location of the base point and the closest determined point, the device can use a finger model to determine where the fingertip point likely resides.

In some embodiments, the device can learn relative fingertip position through machine learning. For example, if a device estimates fingertip position and uses that to determine an input, then the user makes an adjustment or cancels that action and tries to cause an action for a slightly different location, the device can learn information about the offset for different angles and store that information for future determinations.

In some embodiments, the device can instead track the fingertip point as the finger moves towards the dead zone, and assume that the fingertip will follow a similar trajectory to the base point, which can help with the fingertip estimate. Various other estimation or adjustment processes can be used as well within the scope of the various embodiments.

Figure 3:
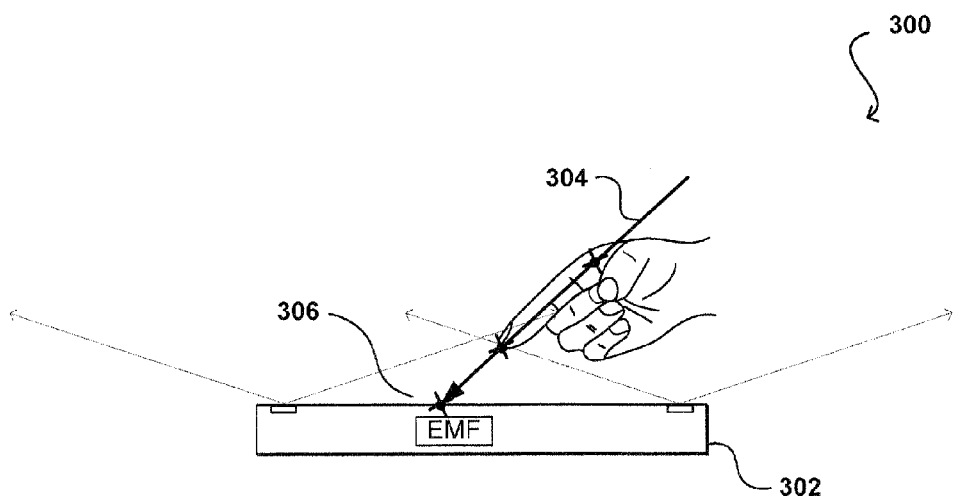
FIG. 3 illustrates an example view wherein the determined fingertip position can be used to determine an input location on the computing device, in accordance with various embodiments.

Being able to accurately determine the fingertip point as well as a base or reference point can help to accurately determine input the user is attempting to provide through a motion or gesture. In some embodiments where the relative location of just the fingertip point selects what is below the fingertip, an accurate determination of that point is necessary. In examples where the fingertip is used to determine where the user is pointing, accurate determination can be necessary to determine the proper pointing direction. For example, FIG. 3 illustrates an example configuration 300 where the fingertip and base points have been determined using a combination of camera and EMF sensor information. Once obtained, the device can determine a virtual vector 304 running through those points towards the computing device 302. The device can determine where that vector intersects the device, and can use that point 306 to determine the type of input that the user is attempting to provide. For example, if the point 306 corresponds to a point on a display screen, the device can determine an element or object displayed at that point and can cause that object to be selected, highlighted, or otherwise adjusted in response to the determination. Similarly, if the point 306 corresponds to a button, control, key, or other such element of the device, the device can utilize that information to determine an appropriate input as well.

Figure 4:
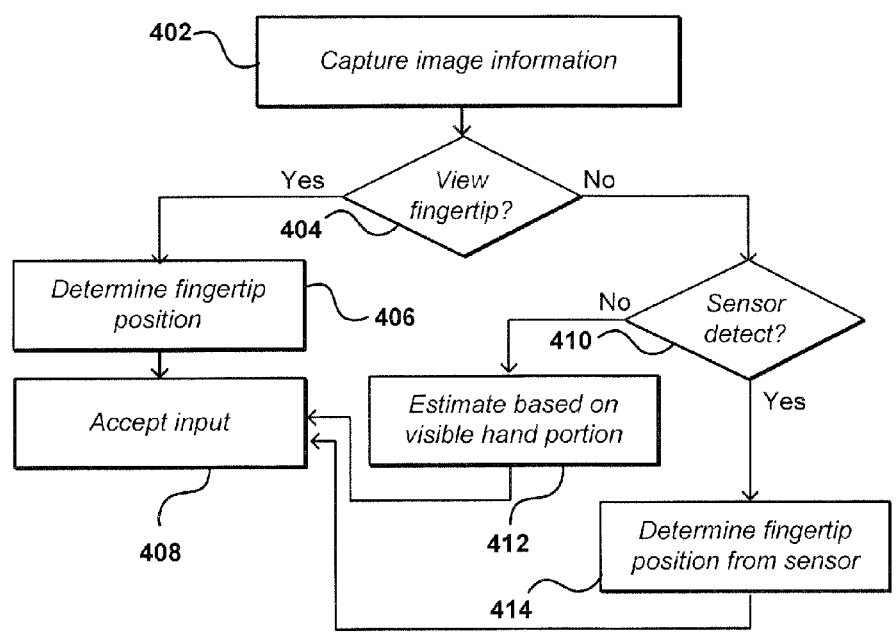
FIG. 4 illustrates an example process for determining an input location on a computing device that can be used in accordance with various embodiments.

FIG. 4 illustrates an example process 400 for determining input based upon a user's finger that can be utilized in accordance with various embodiments. It should be understood that there can be additional, fewer, or alternative steps performed in similar or alternative orders, or in parallel, within the scope of the various embodiments unless otherwise stated. Further, although a finger is used in this example, various other types of object or feature can be used as well within the scope of the various embodiments. In this example, image information is captured 402 using one or more cameras of a computing device. The image information can include video, stereo, or one or more still images. The image information can be analyzed to determine 404 whether the fingertip is visible in the captured image information. If so, the fingertip position can be determined 406 from the image information and an appropriate input can be determined and accepted 408.

If the fingertip cannot be viewed in the image information, a determination can be made 410 as to whether a sensor of the device can detect the fingertip, or a portion of an object associated with the fingertip. If so, the sensor data can be analyzed and used to determine 414 the fingertip position and the appropriate input can be accepted. If the fingertip cannot be detected by at least one sensor, the portion of the hand and/or finger visible in the captured image information can be analyzed 412 to attempt to estimate the location of the fingertip relative to the device. As discussed, the estimation can include using models of the user's finger or hand, image information captured before the fingertip entered a dead zone, or other such information.

Figure 5A:
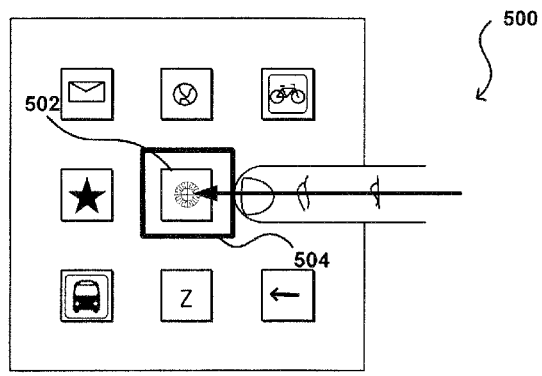
FIGS. 5(a), 5(b), and 5(c) illustrate example inputs that can be determined based at least in part upon the orientation of a finger of a user, in accordance with various embodiments.
Figure 5B:
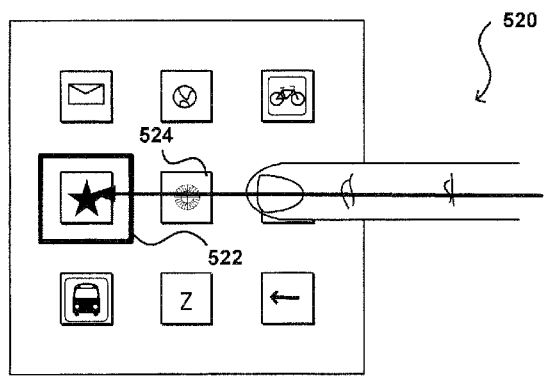

As mentioned, the fingertip point might not be used simply based on its position in a plane parallel to a plane of the device, for example, but might be used with information for the rest of the finger and/or the user's hand to attempt to determine where the user is actually pointing. A process is discussed with respect to FIG. 3 wherein a trajectory or vector corresponding to the pointing direction of the user's finger can be determined. FIGS. 5(a) and 5(b) illustrate an example of how the vector or direction can be used to select certain elements and/or provide certain inputs to a computing device. Such a process can enable a user to interact with a device using gestures or motions, or can enable a user to select an option or element using a thumb or finger when that option or element is beyond the reach of that thumb or finger.

In the view 500 of FIG. 5(a), the user is pointing in a direction that is toward a specific icon 502 on the display. In this example, the fingertip is closest to the icon in a direction parallel to the plane of the display, such that a fingertip point-based determination would select that icon as well. In this example, the device can determine that the user is indicating that icon 502, and can render a bounding box 504 or other indicator that the device has determined the user to be selecting that icon. The user then can perform a selection action, or provide other such input, to cause that icon to be selected or activated, such as by making a tapping motion with the finger, squeezing the device, pressing a button, issuing a voice or gesture command, etc. In some embodiments, the user can point the finger at that icon for a minimum period of time, referred to herein as a "dwell" period, which can cause that icon to be selected. Any appropriate action can then be taken. For example, if the icon corresponds to an application, the user can launch that application by pointing at the icon and then performing a selection action, which can indicate to the device that the user wants to open the application. Other actions can be performed as well, as should be apparent to one of ordinary skill in the art in light of the teachings and suggestions contained herein.

FIG. 5(b) illustrates an example view 520 showing a similar situation where the user's fingertip is in approximately the same location with respect to the device, but the angle of the finger is different. Accordingly, the vector that is determined for the finger direction would intersect the device at a different icon 522 (e.g., instead of icon 524). Thus, even though a fingertip point-based interface might select the same icon for both situations, determining the direction the finger is pointing can provide the user with a more natural control for selecting elements on a computing device.

Figure 5C:
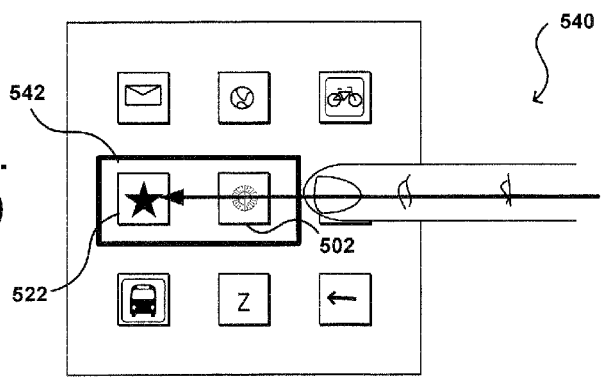

In some embodiments, a user might also use the fingertip direction to control aspects of the selection. For example, the user can point to a first icon 502 using the finger as in view 500 shown in FIG. 5(a), but then can rotate the finger to one side as illustrated in view 540 shown in FIG. 5(c) to point towards at least one additional icon 522 (e.g., in addition to icon 502). As can be seen, this can enable the user to select multiple icons or elements using the fingertip position, as is illustrated by the displayed bounding box 542, although other graphical indicia can be used as well within the scope of the various embodiments.

Figure 6:
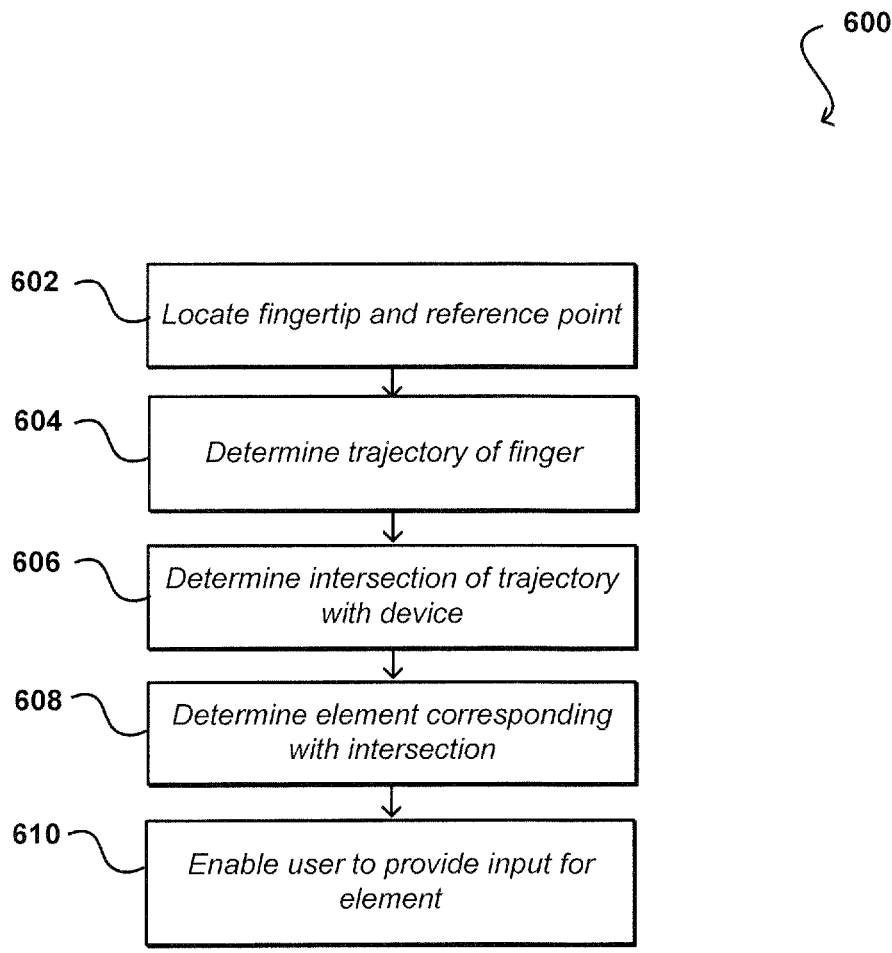
FIG. 6 illustrates an example process for determining an input to a computing device that can be used in accordance with various embodiments.

FIG. 6 illustrates an example process 600 for enabling a user to provide input through the direction of a finger or other such object, in accordance with various embodiments. In this example, the fingertip of the user and at least one reference point on the finger or hand are located 602. As discussed, this can be performed using image data, sensor data, or other information as discussed elsewhere herein. Based at least in part upon those points, a vector corresponding to the current orientation of the user's finger (e.g., a projection of where the user's finger is pointing) can be determined 604, and the intersection of that vector with the device can be determined 606. An element corresponding to that location can be determined 608, at which point the user is enabled 610 to provide input for that element. As discussed, this can include providing a selection action or other input that can be provided to, or used with, the selected element. Various other approaches can be used as well within the scope of the various embodiments.

In some embodiments, a user can be assisted in providing input using a finger, thumb, or other such object by making a determined number of elements selectable. As the user moves the object around, the cursor, bounding box, or other indicator can move or "snap" to the next object, which can help a user to select the intended object, particularly for devices with small form factors or that are at a distance from the user.

Figure 7:
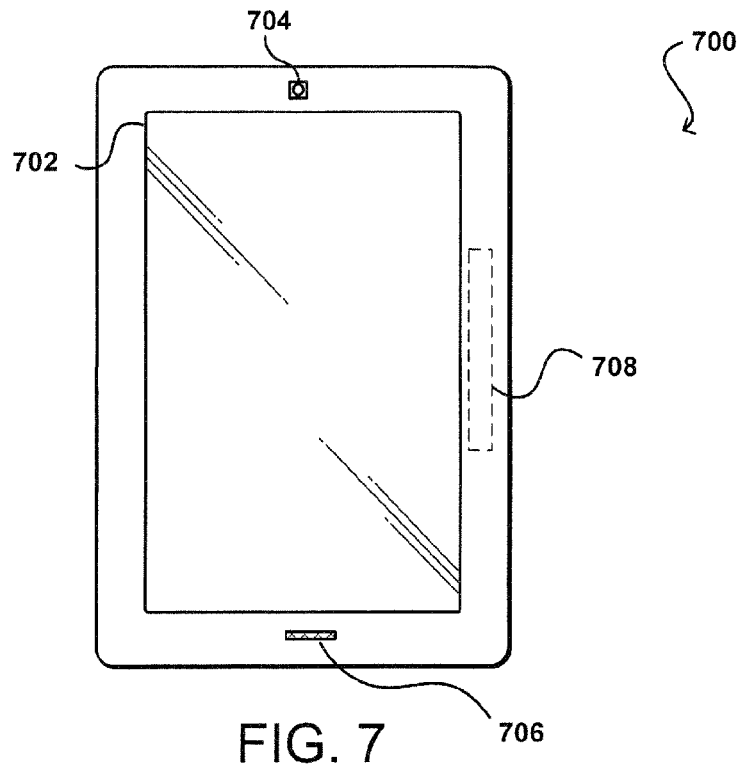
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device, music playing near the device, etc. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device. In some embodiments, a device can start analyzing image information when movement of the device is detected using one of these sensors. In other embodiments, a user can provide input to the device by tilting the device, shaking the device, or performing another such motion or action.

Figure 8:
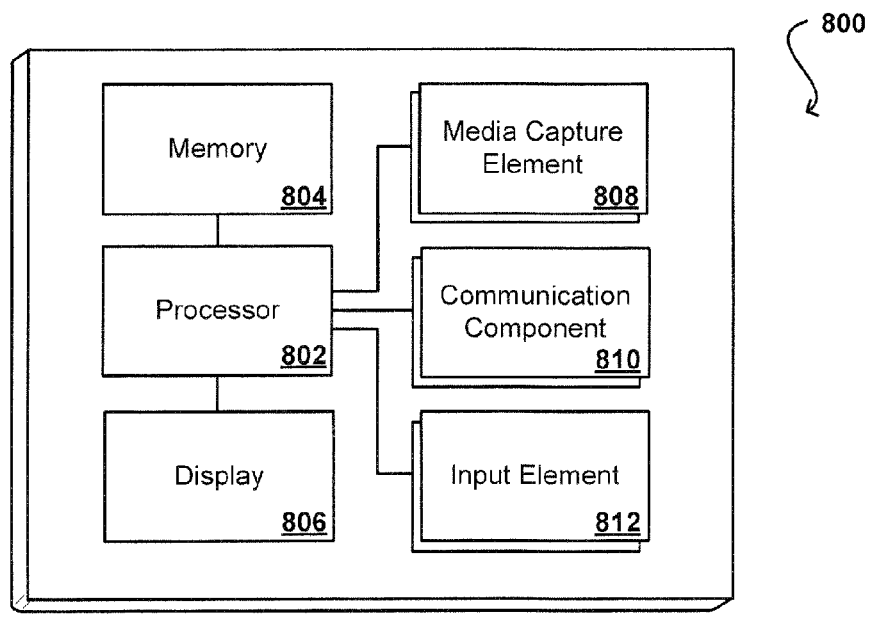
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one media capture element 808 such as a camera or infrared sensor that is able to image projected images or other objects in the vicinity of the device, or an audio capture element able to capture sound near the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can include at least one mono or stereo microphone or microphone array, operable to capture audio information from at least one primary direction. A microphone can be a uni- or omni-directional microphone as known for such devices.

In some embodiments, the computing device 800 of FIG. 8 can include one or more communication components 810, such as a Wi-Fi, Bluetooth, RF, wired, or wireless communication system. The device in many embodiments can communicate with a network, such as the Internet, and may be able to communicate with other such devices. In some embodiments the device can include at least one additional input element 812 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device also can include at least one orientation or motion sensor. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor, whereby the device can perform any of a number of actions described or suggested herein.

Figure 9:
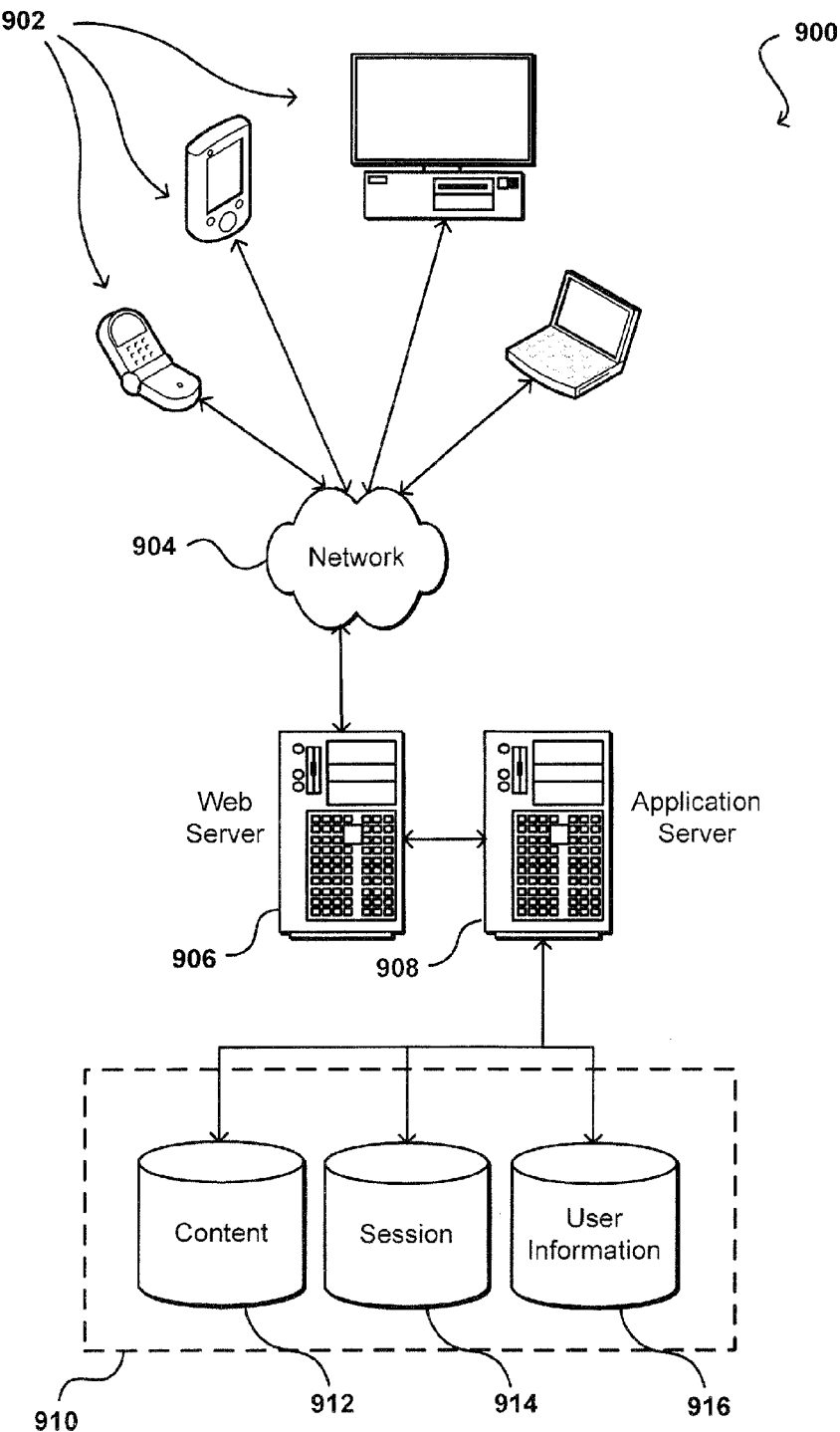
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for locating a fingertip of a user, comprising:
   capturing an image using at least one camera of a computing device;
   determining, from the image, a representation of a first portion of a finger of a user and location information about the first portion of the finger with respect to the computing device;
   determining a second portion of the finger is outside a field of view of the at least one camera;
   determining a model of a hand of the user that includes the first portion of the finger and the second portion of the finger;
   detecting, using at least one sensor of the computing device, a proximity of the second portion of the finger; with respect to the computing device;
   determining a relative location of the second portion of the finger with respect to the computing device based at least in part on the model of the hand of the user, the location information about the first portion of the finger, and the proximity of the second portion;
   determining an approximate trajectory of the finger based at least in part on the location information about the first portion of the finger and the relative location of the second portion of the finger; and
   providing input to an application executing on the computing device based at least in part upon the approximate trajectory of the fingertip.

2. The computer-implemented method of claim 1, wherein the at least one sensor includes at least one of an electromagnetic field sensor, a capacitive sensor, or an ultrasonic sensor.

3. The computer-implemented method of claim 1, wherein determining the model of a hand of the user includes inputting information for the representation of the first portion of the finger and a location of the second portion of the finger relative to the first portion of the finger into a digital model of the finger.

4. The computer-implemented method of claim 1, wherein determining the model of a hand of the user includes using at least one prior relative fingertip location identified in at least one previously captured image before the second portion of the finger moved outside a field of view.

5. The computer-implemented method of claim 1, further comprising:
   tracking a movement of the finger by analyzing multiple images of the finger over time; and
   updating the relative location of the second portion of the finger using the representation of the first portion and the location of the second portion based at least in part upon the movement of the finger.

6. The computer-implemented method of claim 1, further comprising:
determining a virtual vector running through the relative location of the second portion of the finger and the first portion of the finger;
determining an intersection of the virtual vector and the computing device; and
determining a type of input that the user is attempting to provide based at least in part where the virtual vector intersects the computing device.

7. A computer-implemented method, comprising:
capturing an image using at least one camera of a computing device, the image including a representation of a first portion of a hand of a user;
determining that a fingertip of a finger of the hand is outside a field of view of the at least one camera;
analyzing, using at least one processor of the computing device, the image to determine location information for at least one reference point corresponding to the first portion the hand of the user with respect to the computing device;
detecting a proximity of the fingertip of the finger relative to the computing device using at least one sensor;
determining a model of the hand that includes the reference point and the fingertip of the finger;
calculating a relative position of the fingertip with respect to the computing device based at least in part upon the model of the hand, the proximity of the fingertip, and the location information for the at least one reference point;
determining an approximate trajectory of the fingertip based at least in part on the location information for the at least one reference point and the relative position of the fingertip; and
providing input to an application executing on the computing device based at least in part upon the approximate trajectory of the fingertip.

8. The computer-implemented method of claim 7, wherein the at least one sensor includes at least one of an electromagnetic field sensor, a capacitive sensor, or an ultrasonic sensor.

9. The computer-implemented method of claim 7, wherein positions of multiple fingertips are concurrently calculated, and wherein input is provided based at least in part upon the positions of the multiple fingertips.

10. The computer-implemented method of claim 7, wherein the image includes at least one of still image information, stereoscopic image information, infrared image information, or video information.

11. The computer-implemented method of claim 7, wherein calculating the relative position of the fingertip includes providing the at least one reference point to a digital model of the finger that is personalized for the user.

12. The computer-implemented method of claim 7, wherein calculating the relative position of the fingertip includes using at least one previous fingertip position identified from at least one previously-captured image.

13. The computer-implemented method of claim 7, further comprising:
tracking a movement of the finger over time and using the at least one reference point to update the relative position of the fingertip based at least in part upon the movement of the finger.

14. The computer-implemented method of claim 7, wherein calculating the relative position of the fingertip with respect to the computing device is further based at least in part upon physical limitations of the finger of the user.

15. The computer-implemented method of claim 7, wherein calculating the relative position of the fingertip with respect to the computing device is further based at least in part upon machine learning with respect to previous selections made by the user based on previous fingertip locations.

16. A computing device, comprising:
a processor;
at least one camera; and
a memory device including instructions that, when executed by the processor, cause the computing device to:
capture one or more images using the at least one camera, the one or more images including a representation of a first portion of a hand of a user;
determine that a fingertip of a finger of the hand of the user is outside a field of view of the at least one camera;
analyze the one or more images to determine location information for the first portion of the hand of the user with respect to the computing device;
determine a model of the hand that includes the first portion of the finger and the fingertip;
detect, using at least one sensor of the computing device, a proximity of the fingertip with respect to the computing device;
calculate a relative location of the fingertip with respect to the computing device based at least in part upon the model of the hand, the proximity of the fingertip, and the location information for the first portion;
determine an approximate trajectory of the fingertip based at least in part on the location information for the first portion and the relative location of the fingertip;
provide input to an application executing on the computing device based at least in part upon the approximate trajectory of the fingertip.

17. The computing device of claim 16, wherein the at least one sensor includes at least one of an electromagnetic field sensor, a capacitive sensor, or an ultrasonic sensor.

18. The computing device of claim 16, wherein the one or more images includes at least one of still image information, stereoscopic image information, infrared image information, or video information.

19. The computing device of claim 16, wherein calculating the relative location of the fingertip includes providing the first portion to a digital model of the finger.

20. A non-transitory computer-readable storage medium including instructions that, when executed by a processor of a computing device, cause the processor to:
determine a representation of at least a portion of a hand of a user based on an image captured by at least one camera of the computing device;
determine that a second portion of the hand is outside a field of view of the at least one camera based on the image captured by the at least one camera;
analyze the image to determine location information for at least one reference point corresponding to the first portion of the hand of the user with respect to the computing device;
detect a proximity of the second portion of the hand relative to the computing device;
determine a model of the hand that includes the at least one reference point and the second portion of the hand;
calculate a position of the second portion of the hand with respect to the computing device, based at least in part upon the model of the hand, the at least one reference point, and the proximity of the second portion;

determine an approximate trajectory of a fingertip based at least in part on the location information for the at least one reference point and the position of the second portion of the hand; and provide input to an application executing on the computing device based at least in part upon the approximate trajectory of the fingertip.

21. The non-transitory computer-readable storage medium of claim 20, wherein the instructions to detect the proximity of the second portion of the hand relative to the computing device, further cause the processor to detect the proximity of the second portion of the hand using at least one sensor including at least one of an electromagnetic field sensor, a capacitive sensor, or an ultrasonic sensor.

22. The non-transitory computer-readable storage medium of claim 20, wherein positions of multiple fingertips are capable of being concurrently calculated, and wherein the instructions to provide input to the application, the instructions further cause the processor to provide input based at least in part upon the positions of the multiple fingertips.

23. The non-transitory computer-readable storage medium of claim 20, wherein the instructions to calculate the position of the fingertip with respect to the computing device further causes the processor to calculate the position of the finger tip based at least in part upon physical limitations of the finger of the user.

* * * * *